Jan. 28, 1958
R. L. FANNON
2,821,615
CUTTING OF METALS AND ALLOYS
Filed April 22, 1955
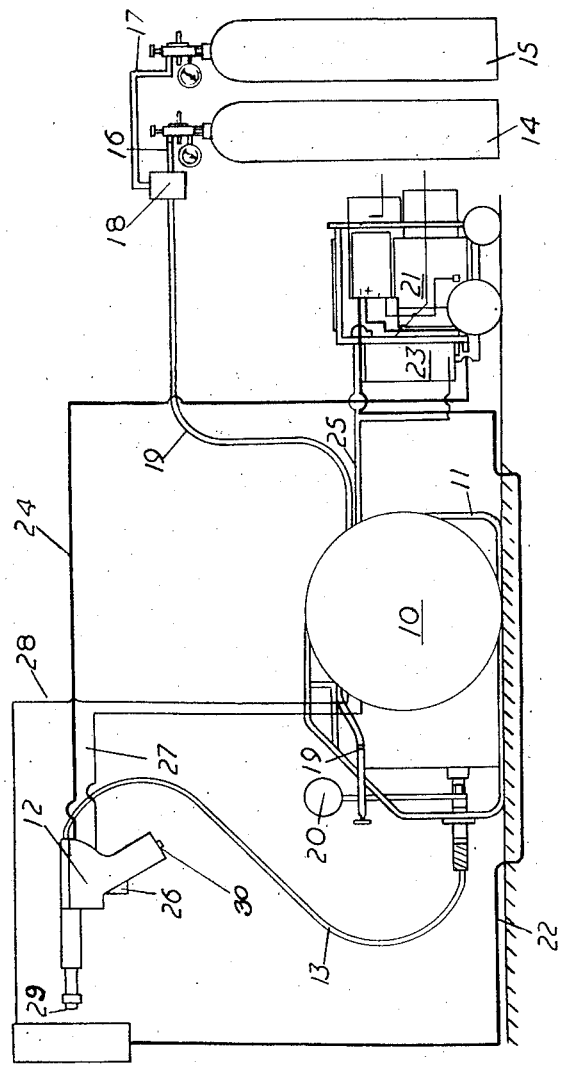
Inventor
ROBERT LEYDON FANNON
By Leo J. Townsend
Attorney

2,821,615

CUTTING OF METALS AND ALLOYS

Robert Leydon Fannon, London, England, assignor to The British Oxygen Company Limited, a corporation of Great Britain Application April 22, 1955, Serial No. 503,153

Claims priority, application Great Britain April 26, 1954

6 Claims. (Cl. 219—69)

The present invention relates to the cutting of metals and alloys by means of a shielded electric arc in conjunction with a consumable electrode.

It has previously been proposed to cut both ferrous and non-ferrous metals by means of a consumable electrode in the form of a ferrous wire fed to a high density arc struck between the wire and the metal to be cut and shielded from the atmosphere with an inert gas, for example argon, the wire being moved relative to the workpiece so as to maintain the arc and cut through the metal. By this means a clean cut at relatively high speed is obtained with little or no distortion of the workpiece by heating.

This invention relates to a process for severing metals and alloys which resist progressive oxidation by an oxygen jet impinging against the heated portions thereof, for example, steels containing chromium in substantial quantities. One of the objects of this invention is to provide a gaseous atmosphere, other than argon by the use of which the removal of metal progresses more rapidly than by use of argon.

It has now been found that if in this process in place of argon, nitrogen in admixture with a small amount of oxygen is used as shielding gas for the arc, increased cutting speeds are attainable without any appreciable loss of quality in the cut.

According to the present invention, therefore, a process for cutting metals and alloys comprises feeding a consumable electrode in the form of a ferrous wire to a high density electric arc struck between the wire and the metal to be cut, feeding nitrogen in admixture with an amount of oxygen not substantially greater than 10% by volume of the total gas mixture to surround the arc, and moving the wire relative to the metal to be cut along the line of cut so as to maintain the arc and to cut through the metal.

While the proportion of oxygen in the shielding gas mixture is not critical it has been found that above 10% oxygen the arc becomes unstable and particularly good results have been obtained in the cutting of stainless steel plate using as shielding gas nitrogen containing approximately 2% by volume of oxygen. Thus in cutting a stainless steel plate of 3/4" thickness, using a 1/16 inch diameter 18% Cr, 8% Ni, 1% W stainless steel wire which was fed at a rate of 330 inches per minute, and a direct current of 315 amps. with a nitrogen/oxygen shielding gas fed to the arc at a rate of 50 cubic feet of nitrogen and 1 cubic foot of oxygen per hour, a cutting speed of 7–8 inches per minute was attained. With argon as the shielding gas at a flow rate of 45 cubic feet per hour but under otherwise identical conditions, the cutting speed was reduced to 5–6 inches per minute.

While the action or the shielding gas in thus increasing the cutting speed is not as yet precisely understood, it is believed that dissociation of the nitrogen within the arc produces additional heat and that the small addition of oxygen assists in the rapid oxidation of the iron in the wire thus again producing additional heat.

While the process of the present invention has been found to be particularly satisfactory when applied to the cutting of stainless steel, it can also be used with advantage in the cutting of many other metals and alloys such as for example, copper.

Relative movement between the wire and the metal to be cut may be effected either manually or automatically, in the latter case using a suitable tractor. Apparatus designed for gas shielded arc welding using a continuous electrode has been found to be quite satisfactory for operating this process. The mixed shielding gases may be supplied to the welding gun or torch from separate nitrogen and oxygen cylinders through a suitably calibrated mixing device which will automatically regulate the oxygen content of the mixture at the desired value.

The invention will now be more particularly described with reference to the accompanying drawing which shows diagrammatically cutting equipment suitable for use in the process of the present invention.

Referring to the drawing, the consumable electrode in the form of a ferrous wire is stored on a wire reel 10 housed within a casing 11 and is withdrawn from the reel 10 and fed to a gun 12 by feed rolls driven by a variable speed electric motor (not shown), both feed rolls and motor being housed within the casing 11. The wire is fed to the gun through a conduit 13 connecting the casing 11 with the gun 12. Shielding gas is provided from a cylinder 14 containing nitrogen and a cylinder 15 containing oxygen. The outlet tubes 16, 17 from the cylinders 14 and 15 respectively lead to a mixing device 18 in which the two gases are mixed in a predetermined ratio. From the mixing device 18, the mixed gas passes through tube 19 provided with a flow indicator 20 to the interior of the conduit 13 and thence to the gun 12.

The current required to strike the cutting arc is supplied to the gun from a suitable power source 21, which may be a direct current generator or a transformer-rectifier unit. One output terminal is connected by a conductor 22 to the workpiece and the other through a contactor 23 by conductor 24 to the electrode wire by means of a contact device provided in the gun 12.

The current required to operate the wire feed motor is also derived from the power source 21 a suitable voltage being fed through conductor 25 to the motor. The operation of the motor is controlled by a switch located within the welding gun and operated by the trigger 26, the motor being connected to the switch by a conductor 27. The motor is also connected to the work through an earth lead 28. The switch operated by the trigger 26 is also adapted to control the flow of shielding gas to the arc.

The gun 12 is of conventional construction and is provided with a nozzle 29 through which the electrode wire and shielding gas are fed to the arc. It is also provided with an inching button 30 for starting the arc as hereinafter described.

In operation, when a cut is to be started, the wire is "inched" forward by means of the inching button 30 until it projects slightly beyond the nozzle 29. The arc current is then switched on and the trigger 26 is depressed to close the switch to start the feed motor and open the supply of shielding gas. The arc is then struck by touching the wire to the work and the cut is then made by traversing the gun along the required line. The electrode feed and flow of shielding gas will continue as long as the trigger 26 is depressed.

I claim:

1. Process for cutting metals and alloys which comprises feeding a consumable electrode in the form of a ferrous wire to a high density electric arc struck between the wire and the workpiece to be cut, feeding nitrogen in admixture with an amount of oxygen not substantially greater than 10% by volume of the total gas mixture to surround the arc, and moving the electrode relative to the workpiece along the line of cut, so as to maintain the arc and cut through the workpiece.

2. Process for cutting metals and alloys which comprises feeding a consumable electrode in the form of a ferrous wire to a high density electric arc struck between the wire and the workpiece to be cut, feeding nitrogen in admixture with approximately 2% by volume of the total gas mixture of oxygen to surround the arc, and moving the electrode relative to the workpiece along the line of cut, so as to maintain the arc and cut through the workpiece.

3. Process for cutting stainless steel which comprises feeding a consumable electrode in the form of a ferrous wire to a high density electric arc struck between the wire and the workpiece to be cut, feeding nitrogen in admixture with an amount of oxygen not substantially greater than 10% by volume of the total gas mixture to surround the arc, and moving the electrode relative to the workpiece along the line of cut, so as to maintain the arc and cut through the workpiece.

4. Process for cutting stainless steel which comprises feeding a consumable electrode in the form of a ferrous wire to a high density electric arc struck between the wire and the workpiece to be cut, feeding nitrogen in admixture with approximately 2% by volume of the total gas mixture of oxygen to surround the arc, and moving the electrode relative to the workpiece along the line of cut, so as to maintain the arc and cut through the workpiece.

5. Process according to claim 1 wherein relative movement between the wire and metal is effected manually.

6. Process according to claim 1 wherein the ratio of nitrogen to oxygen in the gas mixture fed to surround the arc is automatically maintained at a predetermined value.

References Cited in the file of this patent

UNITED STATES PATENTS

| | | |
|---|---|---|
| 1,589,017 | Lincoln | June 15, 1926 |
| 2,053,417 | Brace | Sept. 8, 1936 |
| 2,479,412 | Rutter | Aug. 16, 1949 |
| 2,504,868 | Muller et al. | Apr. 18, 1950 |

FOREIGN PATENTS

| | | |
|---|---|---|
| 1,051,528 | France | Sept. 16, 1953 |
| 709,533 | Great Britain | May 26, 1954 |